United States Patent [19]
Wakase

[11] Patent Number: 4,463,831
[45] Date of Patent: Aug. 7, 1984

[54] SPRING POWERED PRIME MOVER
[75] Inventor: Hiroshi Wakase, Tokyo, Japan
[73] Assignee: Takara Co., Ltd., Tokyo, Japan
[21] Appl. No.: 359,835
[22] Filed: Mar. 19, 1982
[30] Foreign Application Priority Data
  Mar. 24, 1981 [JP] Japan .............................. 56-41046[U]
[51] Int. Cl.³ .................. F03G 1/08; A63H 17/00; A63H 29/04
[52] U.S. Cl. ...................................... 185/39; 74/461; 74/DIG. 10; 185/DIG. 1; 446/464
[58] Field of Search ..................... 185/37, 39, DIG. 1; 46/206; 74/460, 461, DIG. 10

[56] References Cited
U.S. PATENT DOCUMENTS

| 3,081,648 | 3/1963 | Duer | 74/460 X |
| 3,918,198 | 11/1975 | Cheng et al. | 46/206 |
| 4,192,093 | 3/1980 | Hamano | 46/206 X |
| 4,237,175 | 12/1980 | Kobayashi | 74/DIG. 10 X |
| 4,283,879 | 8/1981 | Tsui | 46/206 X |

FOREIGN PATENT DOCUMENTS

| 960859 | 1/1975 | Canada | 46/206 |
| 523013 | 4/1931 | Fed. Rep. of Germany | 46/206 |
| 1192330 | 5/1970 | United Kingdom | 46/206 |

Primary Examiner—Allan D. Herrmann
Attorney, Agent, or Firm—Jackson, Jones & Price

[57] ABSTRACT

An improved spring wound prime mover capable of use with toys is provided. A plastic resin housing member comprises a pair of housing shells having complementary locking pawls and keeper members to permit a snap together assembly. The housing member further supports a spring member that can be selectively connected to a gear train assembly having a first and second gear ratio. The first gear ratio includes gears with a higher degree of mechanical strength than those engaged in the second gear ratio whereby a durable gear transmission is provided that can run smooth for driving the vehicle.

11 Claims, 4 Drawing Figures

SPRING POWERED PRIME MOVER

BACKGROUND OF THE INVENTION

1. Field of the Invention

The present invention is directed to the toy field and more particularly, to a spring powered prime mover which is capable of providing a driving force for toys, such as toy vehicles.

2. Description of the Prior Art

Numerous forms of spring powered prime movers have been used in the toy industry to drive toy vehicles. Every child is familiar with a spring driven toy vehicle. Frequently, the spring drive is powered by a key which stores energy by tightening a spring band into a tensioned coiled condition. Usually, a series of gears alone or in combination with a flywheel are utilized to transmit the released stored energy from the spring into rotational motion for the driving of wheels on the toy vehicle.

As can be readily appreciated, the economics of the toy business require the spring motor to be relatively inexpensive. In this regard, the toy industry has utilized a spring and is affixed to an opening in a metal housing wall. Generally, the housing wall is made of a soft metal having tabs that can be bent to form a rectangular housing configuration. A gear train is appropriately mounted within the housing wall to drive an output shaft. Usually, when the spring is mounted, it must be cut with notches to fit within an aperture in the housing wall. These notches provide a weak point in the spring and frequently permit the fracturing of the spring and release from its anchoring position upon overtensioning by accident.

The toy industry is further seeking to miniaturize toy vehicles to enhance the play value for children and incidentally reduce material cost. Problems occur in providing durable and operative gear transmissions with reduced sizes, especially in molded material.

With the general increase in labor cost around the world, the prior art is still seeking new and improved low cost miniature spring wound prime movers that are equal to or superior to the prior art devices heretofore used. Additionally, the prior art is further seeking to provide a prime mover that can be economically assembled with a minimum of labor.

SUMMARY OF THE INVENTION

The present invention comprises a spring wound prime mover that is capable of driving toys and the like. A housing member is provided and supports an output shaft rotatably mounted to the housing member. The housing member is divided into a pair of shell members that can be interconnected with respective locking pawls and catches at alternative ends of each individual shell members. A cavity in a wall of one shell member has appropriate notches or recesses to co-act with an outer circumferential portion of the spring member for anchoring the same to the shell member. The spring member can be inserted into the recessed cavity without any requirement of alignment and provides a positive and easily assembled anchoring configuration. The other end of the spring member is designed to be moved for use in storing and releasing energy ultimately to an output shaft. A synthetic resin gear train assembly is connected to the spring member and to the output shaft and is capable of providing both a relatively high and a relatively low gear ratio. The gear train assembly can include a first gear that is movably mounted to be automatically forced into engagement when energy is being stored in the spring member. For example, the output shaft can be driven by an external force and the first gear can be engaged to provide a high gear ratio for moving the spring member to store energy. The first gear is automatically forced out of engagement when the spring member drives the output shaft. A second gear is also movably mounted to be automatically forced into engagement when the spring member drives the output shaft to provide a low gear ratio and conversely, is automatically forced out of engagement when the output shaft is driven by an external force for moving the spring member to store energy.

Preferably the modulus of elasticity of the individual gears are varied, for example, by mixing carbon fibers in nylon plastic so that a modulus of 0.3 is provided in the winding gear group and a modulus of 0.25 in the driving gear group. This arrangement provides sufficient mechanical strength to the gear teeth to ensure a high life cycle while assuring a smooth running transmission of the spring energy to the rear axle.

The features of the present invention, which are believed to be novel, are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the toy field to make and use the invention and sets forth the best modes contemplated by the inventor for carrying out his invention. Various modifications, however, will remain readily apparent to those skilled in the toy field, since the generic principles of the present invention have been defined herein specifically to provide a relatively economical and easily manufactured spring wound prime mover for use as a spring motor for toys.

Figure 1:
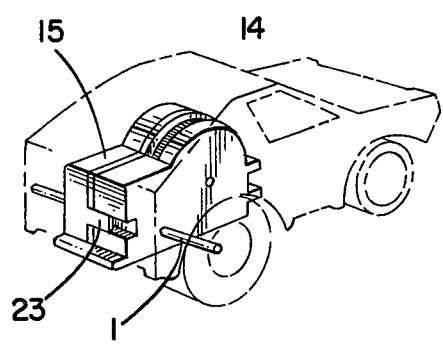
FIG. 1 is a partially phantomed perspective view of a prime mover mounted in a toy vehicle.

Referring to FIG. 1, a partially phantomed perspective view of a toy vehicle incorporating the spring wound prime mover of the present invention is disclosed. The exterior configuration of the housing is preferably made of a plastic material such as polyethylene, nylon, etc., possessing a slight degree of resiliency. A pair of rear wheels are mounted on an output shaft. The exterior configuration of the housing member can be further provided with fastening ears, recesses, tabs, etc. (not shown), to facilitate a snap mounting within the body of the vehicle. When viewing the vehicle from the front with the prime mover appropriately mounted, the housing member comprises a right-hand side shell 15, an intermediate plate 16, and a left-hand side shell 14. The intermediate plate 16 provides gear bearing holes and cam surfaces and physically divides the gear train assembly.

Figure 2:
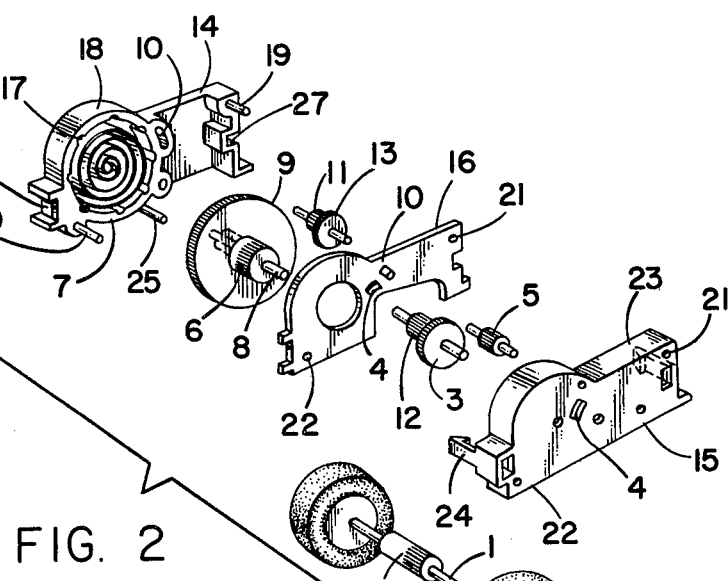
FIG. 2 is an exploded perspective view of the prime mover.

Shell 14 is molded from plastic material and includes a recessed circuitous cavity within a holding drum 18. The periphery of the cavity includes a plurality of notches or recessed portions 17 as can be seen in FIG. 2. A bearing hole (not shown) is centered within the cavity and is designed to receive an axle or a shaft 8 of a large dual gear member. An oblong bearing hole 10 provides a camming surface for a movable combination gear, to be subsequently described. An additional bearing hole is also provided to rotatably receive another gear shaft. Mounting posts 19 and 20 can be integrally molded with the housing shell 14 and are designed to extend through respective friction fitting holes 21 and 22 in the intermediate plate 16, and holes 21' and 22' in the other shell member 15. Another bearing hole 28 is designed to rotatably receive the output shaft 1 which extends through the corresponding bearing hole 29 in the housing shell 14.

Intermediate plate 16 includes an oblong bearing hole 10' that is complementarily positioned relative to the bearing hole 10 for movably supporting a gear. Another oblong bearing hole 4 having a camming surface corresponds to a complementary oblong bearing hole 4' positioned in housing shell 15. Intermediate plate 16 also has an aperture for supporting the shaft of the large dual gear member. Finally, housing shell 15 includes bearing holes 30 and 31 for supporting the shafts of gears.

A spring member 7 has an outer peripheral end bent back upon itself to form a configuration that is complementary to the recessed portion 17 of the housing shell 14. When the spring member 7 expands, it is capable of locking its end in any one of the recessed portions 17. The inner end of the spring member 7 is also bent back upon itself to form an approximately circular loop. This circular loop is configured to interact with a gear shaft that is concentrically located within an integral collar member as can be best seen in FIG. 2. A portion of the spring member extends through an opening slot with the inner end thereby locked against any relative movement to provide the second anchor point for the spring member. Relative rotation of one anchor point to the other anchor point will permit the storage or release of spring energy.

Figure 3:
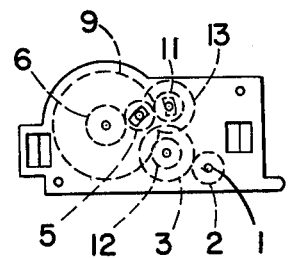
FIG. 3 is a side schematic cross-sectional view of the gear train arrangement.

The gear train assembly of FIGS. 2 and 3 includes a drive pinion 2 mounted on the output shaft 1. This drive pinion 2 is fixedly mounted to mesh with a spur gear 3 that is integrally molded with a second pinion gear 12 mounted on the same axle. A movable idle gear 5 is mounted within the oblong cam bearing holes 10' and 10 of the intermediate plate and the housing shell 14. When rotating in a counterclockwise direction on the right-hand side of intermediate plate 16, the idle gear 5 engages pinion gear 6 which is fixedly mounted in housing shell 14 and the bearing hole 30 of housing shell 15 to transmit energy ultimately to the spring member 7. The pinion gear 6 is integrally molded with large gear 9. A dual gear assembly including a pinion gear 11 and a spur gear 13 can be integrally molded with appropriately extending shafts for mounting within the oblong bearing holes 10' and 10 of respectively intermediate plate 16 and housing shell 14.

When the axle 1 is rotated by the rear wheels to store energy in spring 7, the small drive pinion gear 2 engages and rotates the spur gear 3. Rotation of the spur gear 3 automatically forces the gear 5 to travel along its camming slot 4' to engage and rotate the pinion gear 6. The pinion gear 6 is connected by the shaft 8 to the inner end of the spring member 7 and rotates the same to store energy. During this wind-up mode of operation, the large gear 9 rotates in a counterclockwise direction and automatically disengages the spur gear 13 as the pinion gear 11 is driven upward to the furtherest extent of the arcuate oblong bearing holes 10 and 10'.

When the gear train assembly is in a drive configuration, the spring member 7 is releasing stored energy by rotating shaft 8 and correspondingly the large gear 9. The large gear 9 drives the pinion gear 11 in a clockwise direction to automatically engage spur gear 13 with a second pinion gear 12. Since the second pinion gear 12 is directly connected to the spur gear 3, it rotates at the same speed to drive the pinion gear 2 on the output shaft 1. As can be appreciated, the rotation of the spur gear 3 forces the idle gear 5 to the end of the bearing holes 10 and 10' and thus, automatically out of engagement with the pinion gear 6.

As can be appreciated, gears 5 and 6 are employed in a first gear ratio for the storage of spring energy, and gears 9, 11, 12 and 13 are employed in a second gear ratio for the release of energy during translation of the vehicle across a support surface. Gears 2 and 3 are common to both power trains.

Consistent with the necessity to integrally mold dual gear arrangements, it is desirable in the present invention to try and vary the modulus of elasticity of the gear material by adding carbon-filled fibers, e.g. about 15 percent by volume so that the nylon gears involved in storing energy will have a modulus of about 0.3, while the nylon gears involved in driving the rear wheels will have a modulus of about 0.25. This variation of the modulus of elasticity is desirable to ensure high mechanical strength and smooth interfacing of the gear teeth.

Figure 4:
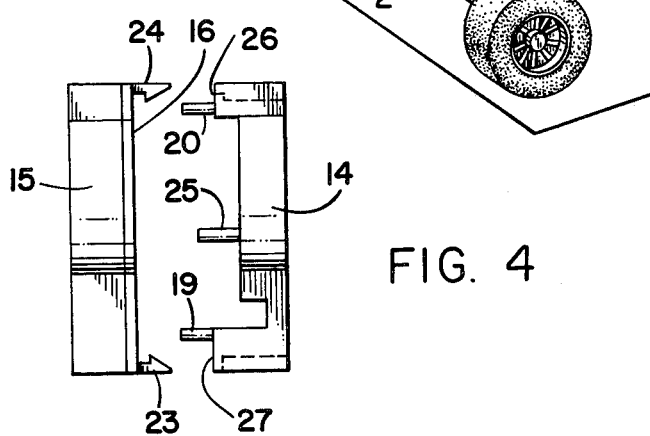
FIG. 4 is a top plan view of the prime mover housing shells.

Referring now to FIGS. 2 and 4, the respective housing shells 15 and 14, along with intermediate plate 16 are disclosed. To facilitate rapid assembly, the housing shell 15 is provided with a pair of flexible cantilevered locking prongs or pawls 23 and 24 that are dimensioned to be complementarily to catch edges or keepers 26 and 27. The enlarged locking heads of the locking prongs include camming surfaces. A spacing post 25 simply ensures that intermediate plate 16 is firmly seated between the respective housing shells 14 and 15. As can be seen in the perspective view of FIG. 2, the edges of intermediate plate 16 are appropriately notched to accommodate the passage of locking pawls 23 and 24. Thus, during assembly, housing shell 15 can be simply snap fitted onto housing shell 14. There is no necessity to use any fasteners or screws.

Throughout the present specification, the term "vehicle" has been utilized. However, it should be readily understood that the prime mover is capable of use on numerous small toys to provide a propulsion force. To appreciate the relative size of the motor that we are referring to, its dimensions can be less than one inch by one-half inch.

As can be readily appreciated, the gear ratios can be subjectively changed by varying the size of the gears. In operation, the child simply grasps the body of the vehicle and moves it backward for three or four inches to tension the spring member 7. Release of the vehicle will then drive it forward for a considerable distance at a relatively rapid velocity.

Modifications of the present invention could be easily accomplished by a person of ordinary skill once given the generic principles of the present invention, accordingly, the scope and spirit of the present invention should be determined only from the following claims:

What is claimed is:

1. A miniature improved spring wound prime mover capable of use in toys and the like comprising:
   a housing member;
   an output shaft rotatably mounted to the housing member;
   a spring member capable of selectively storing and releasing enery to drive the output shaft;
   a plastic resin gear train assembly having a plurality of molded gears connected to the spring member and the output shaft and capable of providing a first and a second gear ratio depending on the specific gears that are engaged, the first gear ratio including gears with molded carbon fibers to provide a higher degree of mechanical strength than those engaged in the second gear ratio, the first gear ratio being engaged for moving the spring member for storing energy and to be automatically forced out of engagement when the spring member drives the output shaft and a second gear ratio automatically forced into engagement when the spring member drives the output shaft and automatically forced out of engagement when the gear train assembly is driven by an external force for moving the spring member to store energy.

2. The invention of claim 1 wherein the gear train assembly includes a first gear movably mounted to be automatically forced into engagement when driven by an external force to provide a first gear ratio.

3. The invention of claim 1 wherein the first gear ratio includes gears having a higher modulus of elasticity than the second gear ratio.

4. The invention of claim 2 wherein the gear train assembly includes a second gear movably mounted to be automatically forced into engagement when the spring member drives the output shaft to provide a second gear ratio and to be automatically forced out of engagement, when driven by an external force, for moving the spring member to store energy.

5. The invention of claim 3 wherein the first gear ratio includes gears formed of nylon and approximately 15 percent by volume of carbon fiber.

6. The invention of claim 3 wherein the first gear ratio includes gears having a modulus of elasticity of approximately 0.3 and the second gear ratio includes gears having a modulus of elasticity of approximately 0.25.

7. The invention of claim 1 wherein the housing member includes a pair of plastic resin housing shells, at least a pair of locking pawls and complementary keeper members are providing on the housing shells to permit the respective housing shells to be interlocked.

8. An improved spring wound prime mover capable of use in toys and the like comprising:
   an output shaft;
   a spring member capable of selectively storing and releasing energy to drive the output shaft;
   a plastic resin gear train assembly having a plurality of gears connected to the spring member and the output shaft and capable of providing a first and a second gear ratio depending on the specific gears that are engaged, the first gear ratio including gears with a higher modulus of elasticity than those engaged in the second gear ratio, the first gear ratio being engaged for moving the spring member for storing energy and to be automatically forced out of engagement when the spring member drives the output shaft and a second gear ratio automatically forced into engagement when the spring member drives the output shaft and automatically forced out of engagement when the gear train assembly is driven by an external force for moving the spring member to store energy, and
   a housing member for supporting the spring member and the gear train assembly in an operative relationship, the housing member formed of a pair of plastic housing shells having between them, and extending from their respective sides, at least a pair of locking pawls and complementary keeper members to lock the respective housing shells together.

9. The invention of claim 8 wherein one housing shell has an integrally molded locking pawl cantilevered from each end of the shell and the other housing shell has a complementary keeper member at each end of the shell.

10. The invention of claim 9 wherein the locking pawl includes an enlarged locking head with a camming surface.

11. A spring wound prime mover capable of use in toys and the like comprising:
   a housing member including a first and second shell member, an intermediate plate member that divides the shell members, and locking pawls that extend from one shell member to the other, one of the shell members has a circuitous cavity with a plurality of recessed positions, the housing shell members are formed from plastic and have complementary keeper members to interact with the locking pawls to lock the respective shell members together;
   an output shaft rotatably mounted to the housing member;
   a spring member capable of selectively storing and releasing energy to drive the output shaft mounted in the ciruitous cavity and being removably anchored to a recessed portion, and
   a gear train assembly connected to the spring member and the output shaft and capable of providing a first and a second gear ratio including a first gear movably mounted to be automatically forced into engagement when driven by an external force to provide a first gear ratio for moving the spring member for storing energy and to be automatically forced out of engagement when the spring member drives the output shaft and a second gear movably mounted to be automatically forced into engagement when the spring member drives the output shaft to provide a second gear ratio and to be automatically forced out of engagement when the gear train assembly is driven by an external force for moving the spring member to store energy, wherein the first gear ratio includes gears formed of nylon and approximately 15 percent by volume of carbon fiber to provide a higher degree of mechanical strength than the second gear ratio.

* * * * *